(12) United States Patent
    Haugen

(10) Patent No.: US 7,770,573 B2
(45) Date of Patent: Aug. 10, 2010

(54) PORTABLE CAMOUFLAGE BLIND FOR HUNTING

(76) Inventor: Edward Haugen, P.O. Box 188, Stormville, NY (US) 12582

( * ) Notice: Subject to any disclaimer, the term of this patent is extended or adjusted under 35 U.S.C. 154(b) by 243 days.

(21) Appl. No.: 11/801,640

(22) Filed: May 10, 2007

(65) Prior Publication Data

US 2007/0209269 A1    Sep. 13, 2007

Related U.S. Application Data

(63) Continuation-in-part of application No. 11/055,131, filed on Feb. 10, 2005, now Pat. No. 7,216,644.

(51) Int. Cl.
    *A01M 31/00*    (2006.01)
    *A01M 31/02*    (2006.01)
(52) U.S. Cl. .............................................. 124/86; 43/1
(58) Field of Classification Search ................ 43/1; 89/36.06, 36.07; 124/23.1, 86, 88; 135/901; 428/919
    See application file for complete search history.

(56) References Cited

U.S. PATENT DOCUMENTS

| | | | | | |
|---|---|---|---|---|---|
| 3,179,102 | A | * | 4/1965 | Peckham | 124/23.1 |
| 4,360,179 | A | * | 11/1982 | Roberts | 248/126 |
| 4,777,755 | A | * | 10/1988 | Colburn | 43/1 |
| 4,817,579 | A | * | 4/1989 | Mathias | 124/23.1 |
| 4,876,817 | A | * | 10/1989 | Hill | 43/1 |
| 5,235,772 | A | * | 8/1993 | Mendick, Jr. | 43/1 |
| 5,293,807 | A | * | 3/1994 | Hajdu | 89/36.07 |
| 5,944,041 | A | * | 8/1999 | Kitchens | 135/98 |
| 6,164,005 | A | * | 12/2000 | Copeland | 43/1 |
| 6,408,865 | B1 | * | 6/2002 | Bliss | 135/118 |
| 6,712,058 | B2 | * | 3/2004 | Porter | 124/86 |
| 6,807,890 | B1 | * | 10/2004 | Fuqua | 89/36.02 |
| 6,941,961 | B1 | * | 9/2005 | Eastman, II | 135/121 |
| 2002/0026742 | A1 | * | 3/2002 | Washington | 43/1 |
| 2002/0078988 | A1 | * | 6/2002 | Valpredo | 135/90 |

\* cited by examiner

*Primary Examiner*—John Ricci
(74) *Attorney, Agent, or Firm*—Arthur M. Peslak, Esq.; Mandel & Peslak, LLC

(57) ABSTRACT

What is disclosed is a portable hunting screen. The hunting screen comprises a frame, camouflage material, and an opening through which a weapon can be fired.

8 Claims, 6 Drawing Sheets

PORTABLE CAMOUFLAGE BLIND FOR HUNTING

PRIORITY

This application is a continuation-in-part of U.S. application Ser. No. 11/055,131 filed on Feb. 10, 2005 now U.S. Pat. No. 7,216,644 to which this application claims priority.

BACKGROUND OF THE INVENTION

The present invention is directed to a portable and compact camouflage blind used by hunters. An object of the present invention is to provide a hunter with adequate concealment during the fair chase of game whenever camouflage is necessary. The present invention may be utilized in many different ways. It may be used by an archer for concealment. In such an embodiment, it attaches directly to a compound bow used for archery. It is also contemplated that it may be used as a ground blind as a self-standing unit in conjunction with a bow, a rifle or a shotgun depending on the particular hunting season.

SUMMARY OF THE INVENTION

The present invention is directed to a hunting screen comprising a generally rectangular first frame that comprises pivoting joints for folding into a flat position, a generally rectangular second frame adapted to be rigidly connected to the first frame whereby the second frame is adjustable in size and forms an opening through which a weapon may be fired, an adjustable mechanism connected to the second frame adapted to connect to and support a weapon to be fired and camouflage material attached to the first frame in such a manner that the opening is not thereby obstructed.

The present invention also provides an alternate embodiment for use in situations where hunters have no ground cover or trees to hide behind. In this embodiment, the hunting screen is provided with a likeness of an animal on the front and a frame for attaching the weapon.

DETAILED DESCRIPTION OF THE INVENTION

The present invention will now be described in terms of the presently preferred embodiments thereof. Those of ordinary skill in the art will recognize that many obvious modifications may be made thereto without departing from the spirit or scope of the present invention.

The present invention is directed to a hunting screen 10 as illustrated in the appended drawings. In the presently preferred embodiment, the hunting screen 10 is contemplated to be approximately 36" in high and 24" in wide. The bow screen 10 comprises a frame 12 that may be covered with camouflage material 14 that is presently available to suit any hunting condition. The camouflage material 14 provides visual concealment for a hunter. The frame 12 is constructed of an ultra-light composite material which is both durable and weather resistant. The camouflage material 14 is sewn onto the frame 12 in such a manner that it stretches over the frame 12 and thereby allows for easy installation and removal. The hunting screen 10 further comprises an opening 16 through which the hunter will fire the weapon. The opening 16 is readily adjustable in size to suit the hunter's need.

Figure 2:
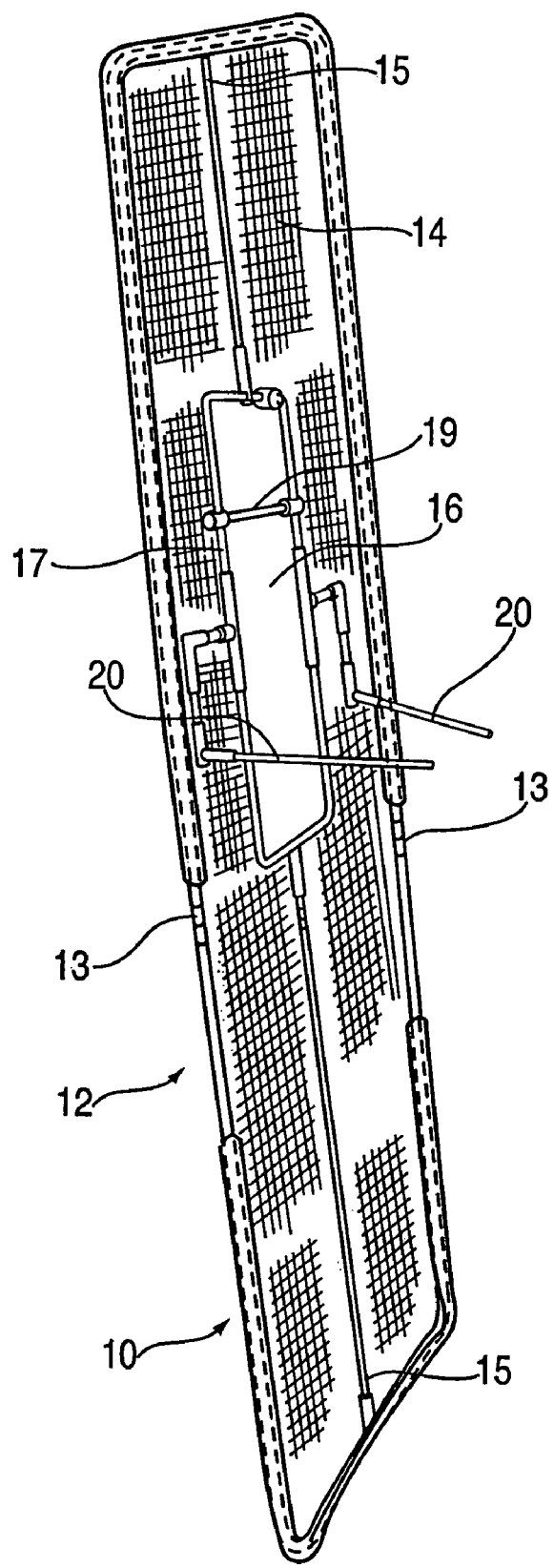
FIG. 2 is a perspective view of the present invention.
Figure 3:
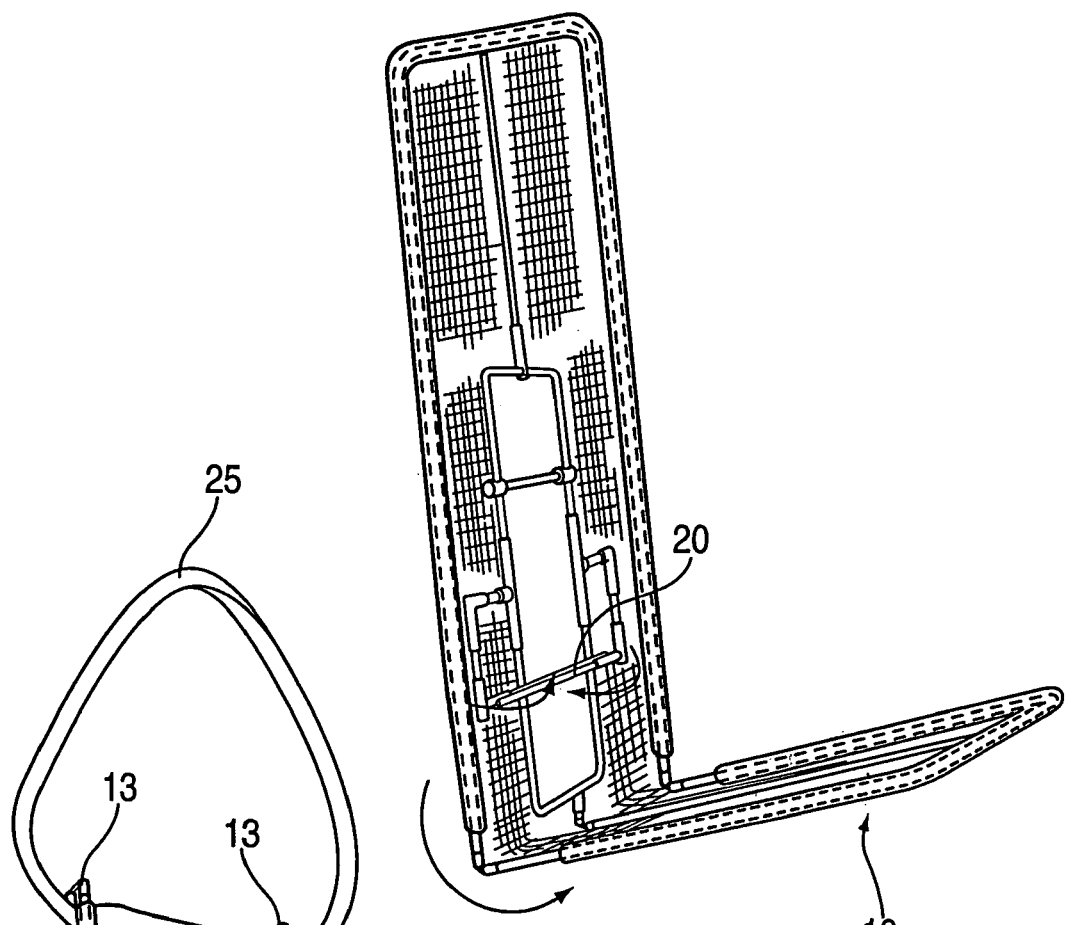
FIG. 3 is an alternate perspective view of the present invention.
Figure 4:
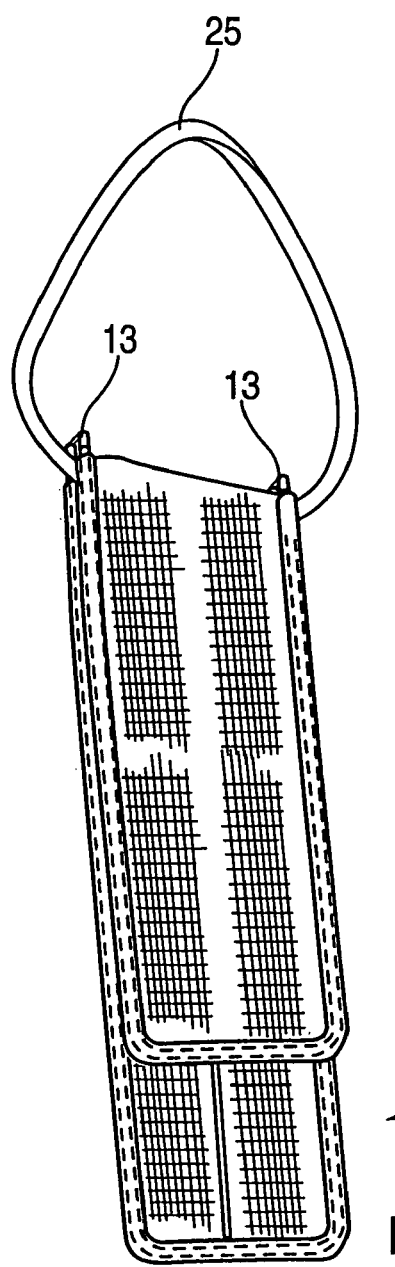
FIG. 4 is another alternate perspective view of the present invention.

As shown in FIG. 2, the frame 12 is generally rectangular in shape. It is provided with a plurality of hinged joints 13 which allows the hunting screen 10 to be folded for easy transport as shown in FIG. 3 and FIG. 4.

The opening 16 is formed by a second frame 17 that is generally rectangular is shape. The second frame 17 is rigidly connected to the frame 12 by means of posts 15. The second frame 17 further comprises crossbars 19. The crossbars 19 are adjustable and moveable so that the opening 16 is adjustable in size. The second frame 17, as further explained below, is adapted in this embodiment to connect a compound bow 18 to the hunting screen 10. The second frame 17 further comprises two swing arms 20, which are used to connect to the weapon.

In the preferred embodiment, the hunting screen 10 is attached to the compound bow 18 by inserting the two swing arms 20 onto a forked fitting 22. The forked fitting 22 is adapted to be threaded into the compound bow riser 19. As is known to those of ordinary skill in the art, a bow stabilizer is usually installed into a bow screen.

Once the hunting screen 10 is attached to the compound bow 18, the hunting screen 10 is ready for use by a hunter. In use, the hunting screen 10 will stand upright on its own, due to the points of contact 24 with the ground. A stabilizer rod 26 is connected from the hunting screen 10 to the compound bow 18 to ensure this position. A small fitting 28 is mounted to the compound bow 18 near the aiming site 19 to connect the bow 18 to the stabilizer rod 26.

After use, the hunting screen 10 may be removed from the bow 18 by separating the swing arms 20 from the forked fitting 22, and removing the stabilizer rod 20 from both the frame and the fitting attached to the bow. The swing arms 20 are then turned back toward the bow, so that they are out of the way for transportation. The stabilizer rod 20 can now be attached to the bow screen frame 14 by storage clips that are provided.

Figure 5:
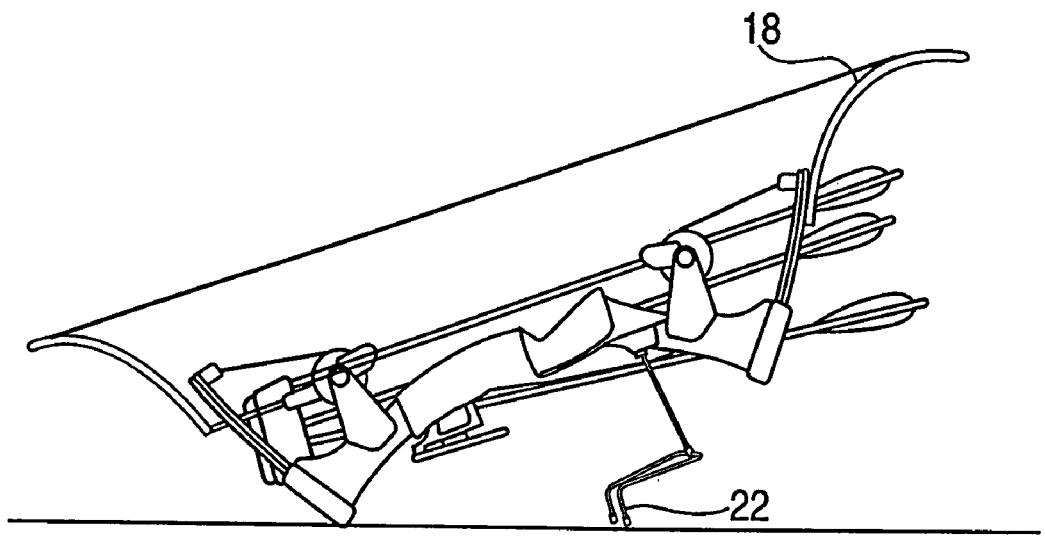
FIG. 5 is an alternate view of the present invention during use.

At this point, as shown in FIG. 5, the compound bow 18 may be set down on the ground upon the forked fitting 22, which remains affixed on the compound bow and the top portion of the compound bow (usually a wheel or cam wheel). This position of the compound bow 18 is a convenient way for the hunter to set it down on the ground so that none of the accessories attached to the bow become entangled with any ground debris.

The hunting screen 10 can now be folded in half at the hinge joints 13 installed on the frame 12. It then may be carried over the hunter's shoulder with a strap 25, for easy transportation. The folded bow screen 10 is now approximately 18"×24" with a total weight of about one pound.

Figure 6:
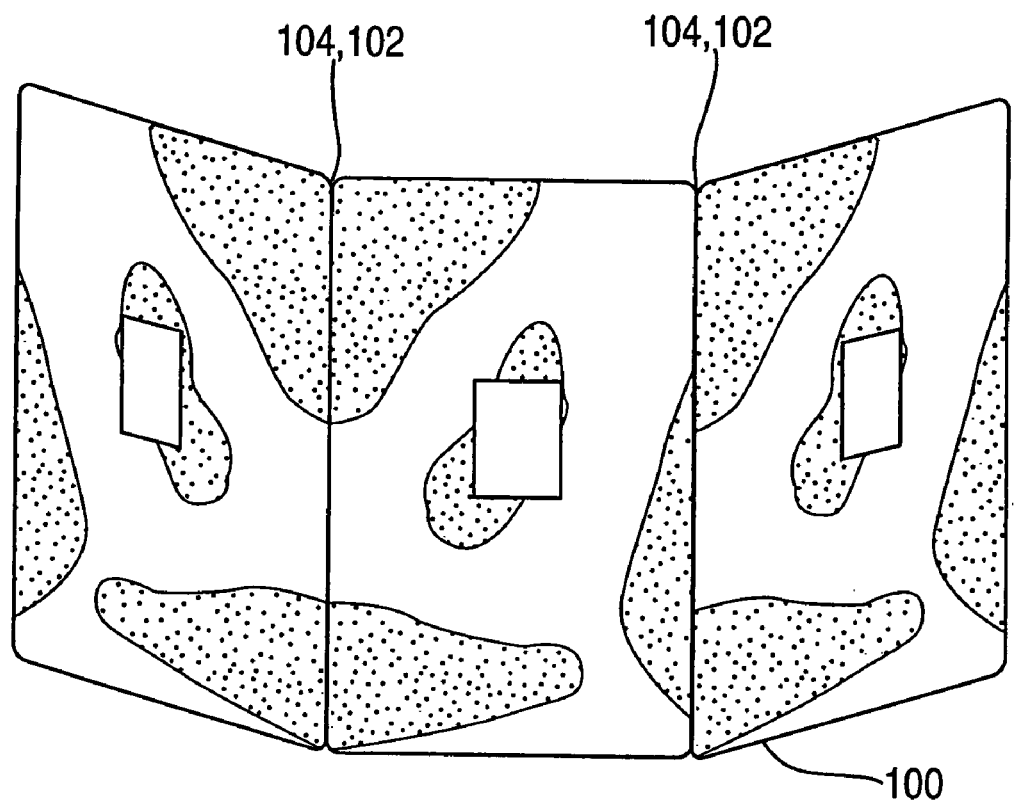
FIG. 6 illustrates an alternate embodiment of the present invention.

An alternative embodiment is illustrated in FIG. 6. In this embodiment, the bow screen 100 may be used as a ground blind. The hunting screen 100 can be unfolded and locked into place by sliding four bushings 102 over folding fittings 104.

At this unfolded position the hunting screen measures approximately 24"×36" and may be placed in such a manner to conceal a hunter.

It may also be used on it 36" side in the semi-folded position to make it self standing. With a second bow screen, that can be clipped together, the ground blind can be set up in many different ways to suit the hunter's needs and to provide a larger concealment area. For example, the blinds can be arranged side to side, end to end, end to side, etc.

Figure 7:
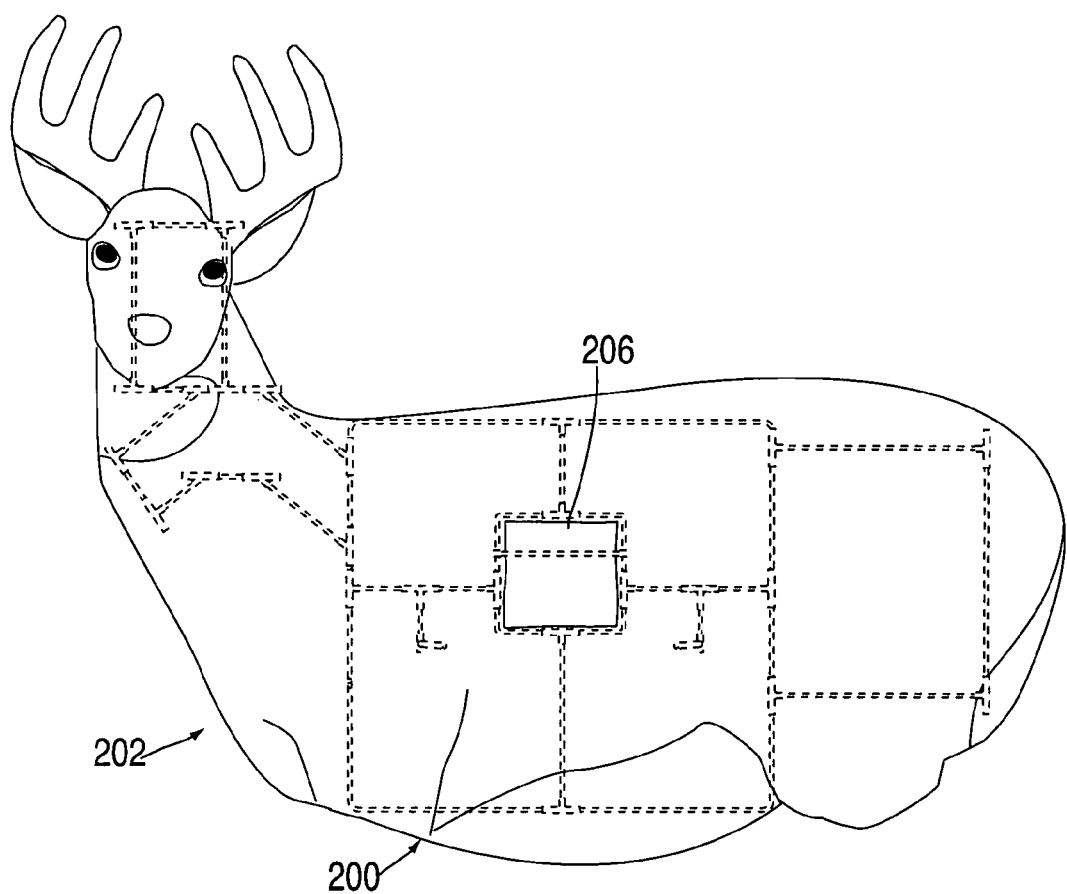
FIG. 7 illustrates a front view of an alternate embodiment of the present invention.
Figure 8:
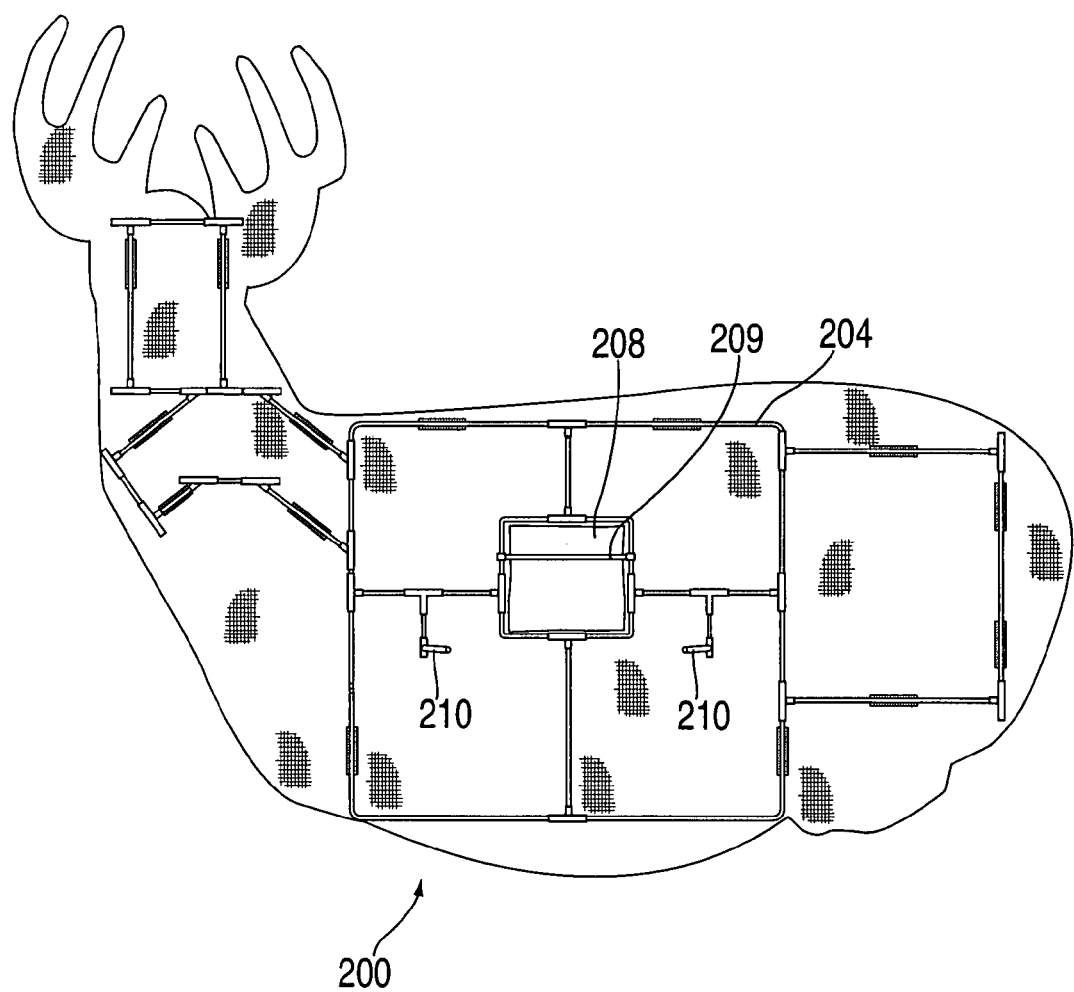
FIG. 8 illustrates a rear view of an alternate embodiment of the present invention.

An alternate embodiment of the present invention is illustrated in FIGS. 7 and 8 and will now be described in detail. When people hunt in areas where the terrain is flat and relatively treeless, such as the plains area of the Western United States, it is difficult for the hunters to conceal themselves from their prey. Consequently, when someone hunts in those areas, they often use cardboard likenesses that are shaped like the animals they are stalking. A hunter will hide behind the cardboard likeness until the animal approaches. At that point, the hunter must come out from behind the cardboard likeness to fire his or her weapon and thereby reveal his presence to the animal prior to firing the weapon. The hunting screen 200 illustrated in FIG. 7 combines the utility of the previously described embodiment with the concept of using an animal likeness to allow the hunter to fire his or her weapon without revealing himself or herself to the prey.

As shown in FIG. 7, the front of the alternate embodiment comprises a likeness of a deer or other animal. The likeness of the animal is printed or silk-screened onto a fabric material 202. The fabric is typically a material that can accept silk screening or be painted with a photograph, although other similar materials can be used.

The fabric material 202 is fitted onto a tubular frame 204. The tubular frame 204 is large enough to accommodate a generally life size likeness of the animal on the front thereof. The tubular frame 204 comprises a generally rectangular and adjustable opening 206. The fabric material 202 comprises a similar opening 208 that is generally aligned with the opening 206. The tubular frame 204 is joined to the fabric material 202 by stitching or welding.

Figure 1:
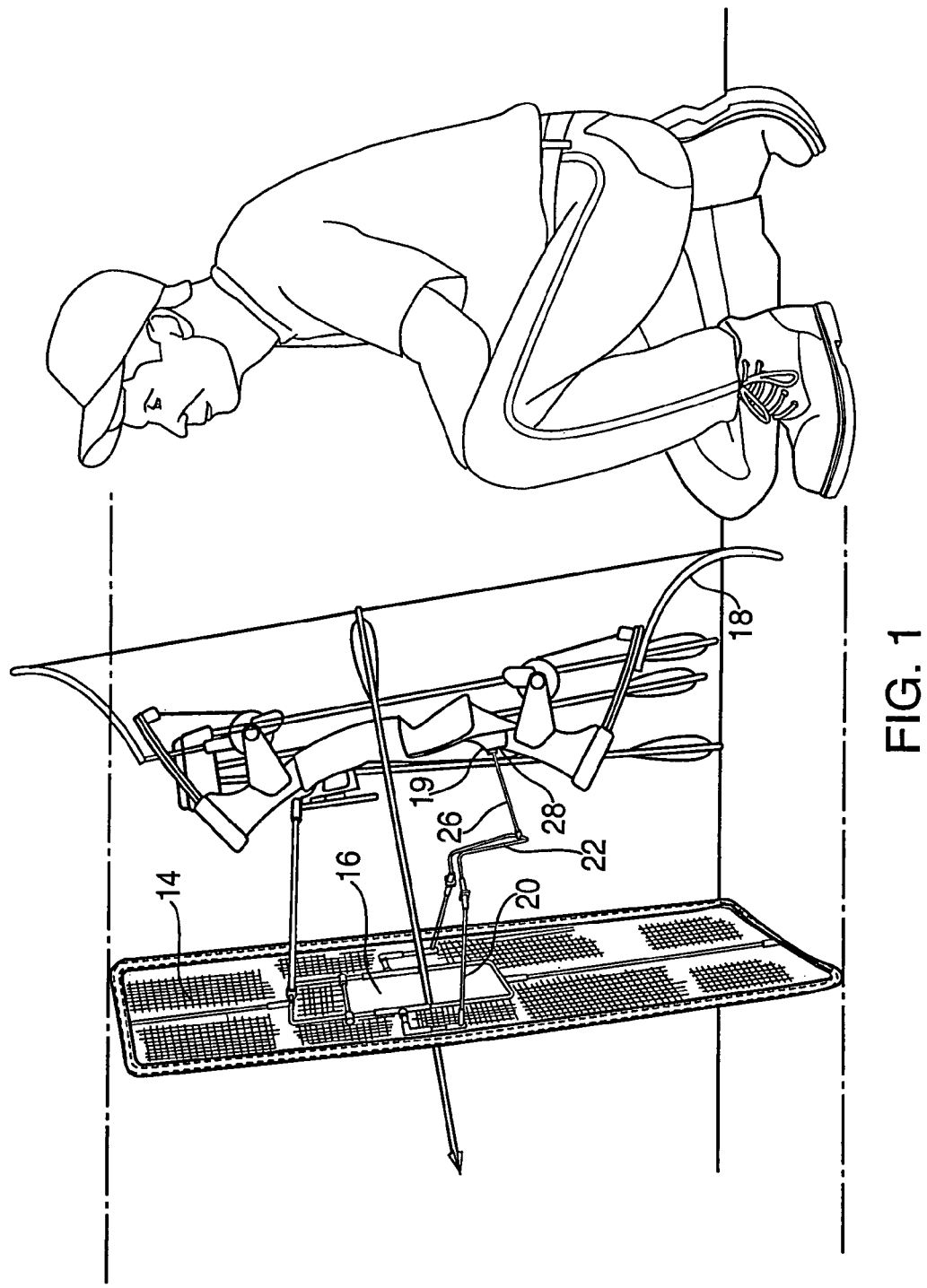
FIG. 1 is an overall plan view illustrating the use of the present invention.

The tubular frame 204 further comprises a mechanism to allow the hunter to mount a variety of weapons for firing through the opening 206. In this embodiment, an adjustable cross-bar 209 is utilized similar to the cross-bar 19 in FIG. 1. The hunting screen 200 further comprises swing arms 210 for connecting a compound bow to the screen like the swing arms 20 illustrated in FIG. 1.

In use, the hunter would stand behind the hunting screen 200 with weapon attached and either wait for the prey to approach or move the hunting screen 200 closer to the prey. When the hunter is within striking distance of the prey, he can then fire his weapon without disclosing his presence to the prey.

Those of ordinary skill in the art will recognize that the embodiments just described merely illustrate the principles of the present invention. Many modifications may be made thereto without departing from the spirit or scope of invention as set forth in the following claims.

What is claimed is:

1. A hunting screen comprising:
   a) A first frame comprising a plurality of tubes and at least one pivoting joint wherein the first frame is adapted to be approximately the size of an animal to be hunted;
   b) A generally rectangular adjustable rigid second frame that is smaller than the first frame(s) and comprising an adjustable opening, adapted to be rigidly mounted internally to the first frame whereby the second frame is adaptable for use with a particular weapon by adjusting the size of the opening;
   c) A plurality of tubes for connecting the second frame to the first frame;
   d) An adjustable mechanism connected to the second frame, comprising a cross-bar that moves up and down the second frame adapted to connect to and support a weapon to be fired; and
   e) A fabric material comprising a likeness of an animal attached to the first frame and comprising an opening generally aligned with the opening in the second frame.

2. The hunting screen of claim 1 whereby the adjustable mechanism is adapted to connect to and support a compound bow.

3. The hunting screen of claim 1 whereby the adjustable mechanism is adapted to connect to and support a rifle.

4. The hunting screen of claim 1 whereby the adjustable mechanism is adapted to connect to and support a shot gun.

5. A hunting screen and weapon combination comprising:
   a. A weapon to be fired;
   b. A first frame comprising a plurality of tubes and at least one pivoting joint wherein the first frame is adapted to be approximately the size of an animal to be hunted;
   c. A generally rectangular adjustable rigid second frame that is smaller than, the first frame and comprising an adjustable opening adapted to be rigidly mounted internally to the first frame whereby the second frame is adaptable for use with a particular weapon by adjusting the size of the opening;
   d. A plurality of tubes for connecting the second frame to the first frame;
   e. An adjustable mechanism connected to the second frame(s), comprising a cross-bar that moves up and down the second frame, adapted to connect to and support a weapon to be fired; and
   f. A fabric material comprising a likeness of an animal attached to the first frame and comprising an opening generally aligned with the opening in the third frame.

6. The hunting screen of claim 5 whereby the adjustable mechanism is adapted to connect to and support a compound bow.

7. The hunting screen of claim 5 whereby the adjustable mechanism is adapted to connect to and support a rifle.

8. The hunting screen of claim 5 whereby the adjustable mechanism is adapted to connect to and support a shotgun.

\* \* \* \* \*